(12) United States Patent
Chockalingam et al.

(10) Patent No.: US 8,675,780 B2
(45) Date of Patent: Mar. 18, 2014

(54) MULTIPLE INPUT MULTIPLE OUTPUT (MIMO) TRANSMITTED SIGNAL VECTOR ESTIMATION EMPLOYING MONTE CARLO SAMPLING TECHNIQUES

(75) Inventors: Ananthanarayanan Chockalingam, Bangalore (IN); Balaji Sundar Rajan, Bangalore (IN); Tanumay Datta, Bangalore (IN); Ashok Kumar. N, Bangalore (IN)

(73) Assignee: Indian Institute of Science, Bangalore (IN)

( * ) Notice: Subject to any disclaimer, the term of this patent is extended or adjusted under 35 U.S.C. 154(b) by 0 days.

(21) Appl. No.: 13/472,519

(22) Filed: May 16, 2012

(65) Prior Publication Data

US 2012/0307924 A1 Dec. 6, 2012

(30) Foreign Application Priority Data

Jun. 3, 2011 (IN) .......................... 1898/CHE/2011

(51) Int. Cl.
*H04L 27/06* (2006.01)
*H04L 27/00* (2006.01)

(52) U.S. Cl.
USPC ........... 375/340; 375/267; 375/259; 375/260; 375/341; 375/316

(58) Field of Classification Search
USPC .................. 375/267, 259, 260, 341, 340, 316
See application file for complete search history.

(56) References Cited

U.S. PATENT DOCUMENTS

| | | | |
|---|---|---|---|
| 6,725,025 B1 * | 4/2004 | Schmidl et al. ............. | 455/278.1 |
| 8,149,810 B1 * | 4/2012 | Narasimhan et al. ......... | 370/343 |
| 2008/0273632 A1 * | 11/2008 | Farhang-Boroujeny et al. ............................. | 375/341 |
| 2009/0003483 A1 * | 1/2009 | Farhang-Boroujeny et al. ............................. | 375/262 |
| 2010/0166260 A1 * | 7/2010 | Huang et al. .................. | 382/103 |

OTHER PUBLICATIONS

Hansen et al. "Near-Optimal Detection in MIMO Systems Using Gibbs Sampling," Proc. IEEE ICC 2009, Honolulu, Dec. 2009, pp. 1-6.*
Kumar et al. "Near-Optimal Large-MIMO Detection Using Randomized MCMC and Randomized Search Algorithms," Proc. IEEE ICC 2011, Kyoto, Jun. 2011, pp. 1-5.*
G. J. Foschini and M. J. Gans, "On Limits of Wireless Communications in a Fading Environment When Using Multiple Antennas," Wireless Pers. Commun., vol. 6, Mar. 1998, pp. 1-25.

(Continued)

*Primary Examiner* — Chieh M Fan
*Assistant Examiner* — Michelle M Koeth
(74) *Attorney, Agent, or Firm* — Narendra Reddy Thappeta

(57) ABSTRACT

A method of determining a transmitted vector (x) in a MIMO receiver includes the steps of receiving a received vector (y) representative of the transmitted vector (x), generating a first random number and forming, in a first iteration, a first symbol of a first candidate vector, the candidate vector representing a potential solution vector. The step of forming is based on a first approach if the first random number is greater than a first predetermined value (q), but is based on a second approach if the random number is less than or equal to the first predetermined value (q). The first approach randomly selects the first symbol from a uniform distribution of symbols in the transmission alphabet. The second approach selects the first symbol based on Gibbs sampling. The method represents a randomized Markov Chain Monte Carlo (RMCMC) sampling technique.

18 Claims, 4 Drawing Sheets

(56) References Cited

OTHER PUBLICATIONS

I. E. Telatar, "Capacity of Multi-Antenna Gaussian Channels," European Trans. Telecommun., vol. 10, No. 6, Nov. 1999,pp. 585-595.
D. Tse and P. Viswanath, Fundamentals of Wireless Communication, Cambridge University Press, 2005,pp. 1-254.
H. Bölcskei, D. Gesbert, C. B. Papadias, and Alle-Jan Van Der Veen, Editors. Space-Time Wireless Systems: From Array Processing to MIMO Communications. Cambridge University Press, 2006,pp. 1-26.
T. L. Marzetta, "How Much Training is Required for Multiuser MIMO?" Asilomar Conf. on Signals, Systems and Computers,pp. 359-363, Oct.-Nov. 2006,pp. 1-5.
H. Taoka and K. Higuchi, "Field Experiment on 5-Gbit/s Ultra-High-Speed Packet Transmission Using MIMO Multiplexing in Broadband Packet Radio Access," NTT DoCoMo Tech. Journ., vol. 9, No. 2, Sep. 2007,pp. 25-31.
K. V. Vardhan, S. K. Mohammed, A. Chockalingam, B. S. Rajan, "A Low-Complexity Detector for Large MIMO Systems and Multicarrier CDMA Systems," IEEE JSAC Spl. Iss. on Multiuser Detection for Adv. Commun. Sys. & Net., vol. 26 No. 3, Apr. 2008,pp. 473-485.
S. K. Mohammed, A. Chockalingam, and B. S. Rajan, "A Low-Complexity Precoder for Large Multiuser MISO Systems," Proc. IEEE VTC'2008, Singapore, May 2008, pp. 797-801.
S. K. Mohammed, A. Zaki, A. Chockalingam, and B. S. Rajan, "High-Rate Space-Time Coded Large-MIMO Systems: Lowcomplexity Detection and Channel Estimation," IEEE Jl. Sel. Topics in Sig. Proc. (JSTSP): Spl. Iss. on Managing Complexity in Multiuser MIMO Systems, vol. 3, No. 6, Dec. 2009, pp. 958-974.
H. Taoka and K. Higuchi, "Experiments on Peak Spectral Efficiency of 50 BPS/Hz With 12-BY-12 MIMO Multiplexing for Future Broadband Packet Radio Access," Proc. Intl. Symp. on Commun., Contr., and Sig. Proc. (ISCCSP'2010), Limassol, Cyprus, Mar. 2010,pp. 1-6.
T. L. Marzetta, "Noncooperative Cellular Wireless With Unlimited Numbers of Base Station Antennas," IEEE Trans. Wireless Commun., vol. 9, No. 11, Nov. 2010,pp. 3590-3600.
J. Hoydis, S. Ten Brink, and M. Debbah, "Massive MIMO: How Many Antennas do we Need?," Online arXiv:1107.1709v1 [cs.IT] Jul. 8, 2011,pp. 1-6.
J. Jose, A. Ashikhmin, T. Marzetta, and S. Viswanath, "Pilot Contamination and Precoding in multi-cell TDD Systems," IEEE Trans. Wireless Commun., vol. 10, No. 8, Aug. 2011, pp. 2640-2651.
H. Huh, G. Caire, H. C. Papadopoulos, and S. A. Ramprashad, "Achieving "Massive Mimo"Spectral Efficiency With a Not-So-Large Number of Antennas," online arXiv:1107.3862v2 [cs.IT] Sep 13, 2011,pp. 1-40.
H. Q. Ngo, E. G. Larsson, and T. L. Marzetta, "Uplink Power Efficiency of Multiuser MIMO With Very Large Antenna Arrays," Proc. Allerton Conf. on Commun., Contr., and Comput., Sep. 2011,pp. 1272-1279.
F. Rusek, D. Persson, B. K. Lau, E. G. Larsson, T. L. Marzetta, O. Edfors, and F. Tufvesson, "Scaling Up MIMO: Opportunities and Challenges With Very Large Arrays," accepted IEEE Signal Processing Magazine. http://urn.kb.se/resolve?urn=urn:nbn:se:liu:diva-71581,pp. 1-30.
B. Cerato and E. Viterbo, "Hardware Implementation of Low-Complexity Detector for Large MIMO," Proc. IEEE ISCAS'2009, Taipei, May 2009,pp. 1-4.
P. Li and R. D. Murch, "Multiple Output Selection-LAS Algorithm in Large MIMO Systems," IEEE Commun. Lett., vol. 14, No. 5, May 2010,pp. 399-401.
N. Srinidhi, T. Datta, A. Chockalingam, and B. S. Rajan, "Layered Tabu Search Algorithm for Large-MIMO Detection and a Lower Bound on ML Performance," IEEE Trans. on Commun., vol. 59, No. 11, Nov. 2011, pp. 2955-2963.
T. Datta, N. Srinidhi, A. Chockalingam, and B. S. Rajan, "Random-Restart Reactive TABU Search Algorithm for Detection in Large-MIMO Systems," IEEE Commun. Letters, vol. 14, No. 12, Dec. 2010,pp. 1107-1109.

S. K. Mohammed, A. Chockaliangam, and B. S. Rajan, "Low-Complexity Near-Map Decoding of Large Non-Orthogonal STBCS using PDA," Proc. IEEE ISIT'2009, Seoul, Jun.-Jul. 2009, pp. 1-5.
P. Som, T. Datta, N. Srinidhi, A. Chockalingam, and B. S. Rajan, "Low-Complexity Detection in Large-Dimension MIMOISI Channels Using Graphical Models," IEEE Jl. Sel. Topics in Signal Processing (JSTSP): Special issue on Soft Detection for Wireless Transmission, vol. 5, No. 8, Dec. 2011,pp. 1497-1511.
J. Goldberger and A. Leshem, "MIMO Detection for High-Order QAM Based on a Gaussian Tree Approximation," IEEE Trans. Inform. Theory, vol. 57, No. 8, Aug. 2011,pp. 4973-4982.
C. Knievel, M. Noemm and P. A. Hoeher, "Low Complexity Receiver for Large-MIMO Space Time Coded Systems," Proc. IEEE VTC-Fall'2011, Sep. 2011,pp. 1-5.
R. Chen, J. S. Liu, and X. Wang, "Convergence Analyses and Comparisons of Markov Chain Monte Carlo Algorithms in Digital Communications," IEEE Trans. Sig. Proc., vol. 50, No. 2, Feb. 2002,pp. 255-270.
B. Farhang-Boroujeny, H. Zhu, and Z. Shi, "Markov Chain Monte Carlo Algorithms for CDMA and MIMO Communication Systems," IEEE Trans. Sig. Proc., vol. 54, No. 5, May 2006,pp. 1896-1909.
H. Zhu, B. Farhang-Boroujeny, and R. R. Chen, "On Performance of Sphere Decoding and Markov Chain Monte Carlo Methods," IEEE Sig. Proc. Lett., vol. 12, No., 10, Oct. 2005,pp. 669-672.
X. Mao, P. Amini, and B. Farhang-Boroujeny, "Markov Chain Monte Carlo MIMO Detection Methods for High Signal-Tonoise Ratio Regimes," Proc. IEEE Globecom'07, Washington DC, Nov. 2007,pp. 1-5.
S. Akoum, R. Peng, R-R. Chen and B. Farhang-Boroujeny, "Markov Chain Monte Carlo Detection Methods for High SNR Regimes," Proc. IEEE GLOBECOM'09, Nov.-Dec. 2009,pp. 1-5.
R-R. Chen, R. Peng, and B. Farhang-Boroujeny, "Markov Chain Monte Carlo: Applications to MIMO Detection and Channel Equalization," Proc. IEEE ITA'09, San Diego, Feb. 2009,pp. 1-6.
R. Peng, R-R. Chen, and B. Farhang-Boroujeny, "Markov Chain Monte Carlo Detectors for Channels With Intersymbol Interference," IEEE Trans. Signal Proc., vol. 58, No. 4, Apr. 2010,pp. 2206-2217.
M. Hansen, B. Hassibi, A. G. Dimakis, and W. Xu, "Near-Optimal Detection in MIMO Systems Using Gibbs Sampling," Proc. IEEE ICC'2009, Honolulu, Dec. 2009,pp. 1-6.
D. J. C. Mackay, Information Theory, Inference and Learning Algorithms, Cambridge Univ. Press, 2003,pp. 1-640.
C. P. Robert and G. Casella, Monte Carlo Statistical Methods, Springer, 2nd Edition, 2004, pp. 1-364.
O. Haggsstrom, Finite Markov Chains and Algorithmic Applications, Cambridge Univ. Press, 2002, pp. 1-123.
A. Kumar, S. Chandrasekaran, A. Chockalingam, and B. S. Rajan, "Near-Optimal Large-MIMO Detection Using Randomized MCMC and Randomized Search Algorithms," Proc. IEEE ICC'2011, Kyoto, Jun. 2011,pp. 1-5.
L. G. Barbero and J. S. Thompson, "Fixing the Complexity of the Sphere Decoder for MIMO Detection," IEEE Trans. Wireless Commun., vol. 7, No. 6, Jun. 2008,pp. 2131-2142.
H. Sari, G. Karam, and I. Jeanclaude, "Transmission Techniques for Digital Terrestrial TV Broadcasting," IEEE Commun.Mag., vol. 33, No. 2, Feb. 1995, pp. 100-109.
D. Falconer, S. L. Ariyavisitakul, A. Benyamin-Seeyar, and B. Eidson, "Frequency Domain Equalization for Single-Carrier Broadband Wireless Systems," IEEE Commun. Mag., Apr. 2002, pp. 58-66.
S. Ohno, "Performance of Single-Carrier Block Transmissions Over Multipath Fading Channels With Linear Equalization," IEEE Trans. Signal Process., vol. 54, No. 10, Oct. 2006,pp. 3678-3687.
X. Ma, L. Yang, and G. B. Giannakis, "Optimal Training for MIMO Frequency-Selective Fading Channels," IEEE Trans.Wireless Commun., vol. 4, Mar. 2005, pp. 453-466.
Y. S. Chen and C. A. Lin, "Blind-Channel Identification for MIMO Single-Carrier Zero-Padding Block-Transmission Systems," IEEE Trans. Circuits and Systems, vol. 55, No. 6, Jul. 2008,pp. 1571-1579.
Y. S. Chen, "Semiblind Channel Estimation for MIMO Single Carrier With Frequency-Domain Equalization Systems," IEEE Trans. Veh. Tech., vol. 59, No. 10, Jan. 2010,pp. 53-63.
E. J. Candes and M. B. Wakin, "An Introduction to Compressive Sampling," IEEE Signal Process. Mag., vol. 25, Mar. 2008,pp. 21-30.

(56) References Cited

OTHER PUBLICATIONS

E. J. Candes and T. Tao, "Near-Optimal Signal Recovery From Random Projections: Universal Encoding Strategies?," IEEE Trans. Inf. Theory,vol. 52, Dec. 2006,pp. 5406-5425.
W. Dongming, H. Bing, Z. Junhui, G. Xiqi, and Y. Xiaohu, "Channel Estimation Algorithms for Broadband MIMO-OFDM Sparse Channel," Proc. IEEE PIMRC'2003, Beijing, Sep. 2003,pp. 1-5.
C-Y. Chiu, J-B. Yan, and R. D. Murch, "24-port and 36-port antenna cubes suitable for MIMO wireless communications," IEEE Trans. on Antennas and Propagation, vol. 56, No. 4, pp. 1170-1176, Apr. 2008.
Z. Tian, G. Leus, and V. Lottici, "Detection of Sparse Signals Under Finite-Alphabet Constraints," Proc. IEEE ICASSP'2009,Taipei, Apr. 2009,pp. 2349-2352.
E. Biglieri and M. Lops, "Multiuser Detection in a Dynamic Environment—Part I: User Identification and Data Detection," IEEE Trans. Inf. Theory, vol. 53, No. 9, Sep. 2007,pp. 3158-3170.
D. Angelosante, E. Biglieri, and M. Lops, "Low-Complexity Receivers for Multiuser Detection With an Unknown Number of Active Users," Proc. IEEE PIMRC'2008, Cannes, Sep. 1-10, 2008.
A. T. Campo, A. G. Fabregas, and E. Biglieri, "Large-System Analysis of Multiuser Detection With an Unknown Number of Users: A High-SNR Approach," IEEE Trans. Inf. Theory, vol. 57, No. 6, Jun. 2011,pp. 3416-3428.
H. Zhu and G. B. Giannakis, "Exploiting Sparse User Activity in Multiuser Detection," IEEE Trans. Commun., vol. 59, No. 2,Feb. 2011,pp. 454-465.
T. Datta, A. Kumar and A. Chockalingam, and B. S. Rajan, "A Novel MCMC Based Receiver for Large-Scale Uplink Multiuser MIMO Systems,"online arXiv:1201.6034v1 [cs.IT] Jan. 29, 2012,pp. 1-37.
F. Jelinek, L. R. Bahl, J. Cocke, and J. Raviv, "Optimal Decoding of Linear Codes for Minimizing Symbol Error Rate," IEEE Trans. Inf. Theory,vol. IT-20, Mar. 1974,pp. 284-287.
M. K. Hanawal and R. Sundaresan, "Randomised Attacks on Passwords," Technical Report TR-PME-2010-11, DRDO-IISc Programme on Advanced Research in Mathematical Engineering, Feb. 12, 2010. Available online: http://www.pal.ece.iisc.ernet.in/PAM/docs/techreports/tech rep10/TR-PME-2010-11.pdf,pp. 1-10.
M.K.Hanawal and R.Sundaresan, "Guessing Revisited: A Large Deviations Approach," IEEE Transactions on Information Theory, vol. 57, No. 1, Jan. 2011,pp. 70-78.
E. Arikan, "An Inequality on Guessing and Its Application to Sequential Decoding," IEEE Transactions on Information Theory, vol. 42, No. 1, Jan. 1996,pp. 99-105.
M. Hansen, B. Hassibi, A. G. Dimakis, and W. Xu, "Near-Optimal Detection in MIMO Systems Using Gibbs Sampling," Proc. IEEE ICC'2009, Honolulu, Dec. 2009. Also available online: arXiv:0910.1463v1 [cs.IT] Oct. 8, 2009,pp. 1-6.
N. Srinidhi, Saif K. Mohammed, A. Chockalingam, and B. Sundar Rajan, "Low-complexity near-ML decoding of large non-orthogonal STBCs using reactive tabu search," Proc. IEEE ISIT'2009, Seoul, Jun.-Jul. 2009.
Suneel Madhekar, Pritam Som, A. Chockalingam, and B. Sundar Rajan, "Belief propagation based decoding of large non-orthogonal STBCs," Proc. IEEE ISIT'2009, Seoul, Jun.-Jul. 2009.
Pritam Som, Tanumay Datta, A. Chockalingam, and B. Sundar Rajan, "Improved large-MIMO detection based on damped belief propagation," Proc. IEEE ITW'2010, Cairo, Jan. 2010.
Bertrand Devillers, Jérôme Louveaux and Luc Vandendorpe, "About the diversity in cyclic prefixed single-carrier systems",Physical Communication, Year 2008, p. 266-276.
Zhengdao Wang, Xiaoli Ma and Georgios B. Giannakis, "OFDM or Single-Carrier Block Transmissions?", IEEE Trans. Commun.,vol. 52, No. 3, Mar. 2004,pp. 380-394.
David L. Donoho, "Compressed Sensing", IEEE Transactions on Information Theory, vol. 52, No. 4, Year Apr. 2006, p. 1289-1306.
Alyson K. Fletcher, Sundeep Rangan and Vivek K Goyal, "A Sparsity Detection Framework for On-Off Random Access Channels", ISIT 2009, Seoul, Korea, Jun. 28-Jul. 3, 2009, p. 169-173.

\* cited by examiner

MULTIPLE INPUT MULTIPLE OUTPUT (MIMO) TRANSMITTED SIGNAL VECTOR ESTIMATION EMPLOYING MONTE CARLO SAMPLING TECHNIQUES

RELATED APPLICATIONS

The present application is related to and claims priority from co-pending India provisional patent application entitled, "NEAR-OPTIMAL LARGE-MIMO DETECTION USING RANDOMIZED MCMC WITH RESTARTS", application serial number: 1898/CHE/2011, filed on 3 Jun. 2011, naming as inventors Kumar et al. and is incorporated in its entirety herewith.

BACKGROUND

1. Technical Field

Embodiments of the present disclosure relate generally to communication systems, and more specifically to techniques for detection of a transmitted signal (vector) in multiple-input multiple-output (MIMO) communication systems, using Monte Carlo sampling techniques.

2. Related Art

Multiple-input multiple-output (MIMO) communication systems (MIMO systems) are well known in relevant arts, and generally refer to systems in which multiple antennas are employed for communication between a transmitting device (MIMO transmitter) and a receiving device (MIMO receiver). The transmitting device may either represent a single device with the multiple antennas, or multiple (separate) devices, each with its own antenna(s). MIMO technology is currently utilized in wireless communication according to standards such as, for example, IEEE 802.11n, 802.11ac, LTE-Advanced, WiMAX, etc. Each of the multiple separate MIMO transmitters may represent a different user. For example, assuming there are Nt different users, each having one transmit antenna, a total of Nt symbols are transmitted simultaneously in each "symbol period", one symbol from each of the Nt users. One of several modulation techniques may be used to transmit each of the symbols. In addition, suitable MIMO encoding techniques may be employed in the MIMO transmitter to generate the symbols after modulation.

A corresponding MIMO receiver with Nr receive antennas (Nr being equal to, or different from (typically larger than) Nt) may receive, on each of the Nr antennas, a superposition of the Nt symbols altered by the wireless channel during propagation from the transmitter(s) to the receiver. Detection (or estimation) refers to determination/estimation, at the MIMO receiver, of the values of each of the Nt transmitted symbols in each symbol period.

MIMO systems that employ large number of antennas (for example, to achieve high data transmission rates, throughputs), the process of detection may be associated with correspondingly high computational complexity. Another concern with detection techniques in a MIMO receiver may relate to performance (or reliability). In general, the detection needs to determine (or estimate) the transmitted symbols accurately, preferably close to optimum bit-error rate (BER) performance. In general, a lower BER corresponds to a better performance of the detection techniques, and vice-versa.

Markov Chain Monte Carlo (MCMC) sampling techniques have previously been employed in a MIMO receiver for the estimation of the multiple (Nt) transmitted symbols. However, simple MCMC sampling techniques employing Gibbs sampling may be associated with a potential drawback generally termed "stalling" that may occur at high receive signal-to-noise ratio (SNR). Stalling occurs when the iterations of the MCMC technique repeatedly generate the same candidate vector (constructed from the transmitted symbol alphabet) as a next potential solution vector, such that the estimation may 'stall', i.e., does not progress further.

Several features of the present invention provide a MIMO signal estimation technique employing MCMC techniques that obviates the stalling problem noted above, and provides good performance while being of sufficiently low-complexity for its implementation.

SUMMARY

A method of determining a transmitted vector (x) in a MIMO receiver comprises the following steps:

a) receiving a received vector (y) representative of the transmitted vector (x)

b) generating a first random number c) forming, in a first iteration, a first symbol of a first candidate vector, the candidate vector representing a potential solution vector.

The step of forming is based on a first approach if the first random number is greater than a first predetermined value (q), but is based on a second approach if the random number is less than or equal to the first predetermined value (q). The first approach randomly selects the first symbol from a uniform distribution of symbols in the transmission alphabet. The second approach selects the first symbol based on Gibbs sampling. The method represents a randomized Markov Chain Monte Carlo (RMCMC) sampling technique. Structures of a MIMO receiver implementing the approaches, and systems using such receivers, are also disclosed.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Environment

Figure 1:
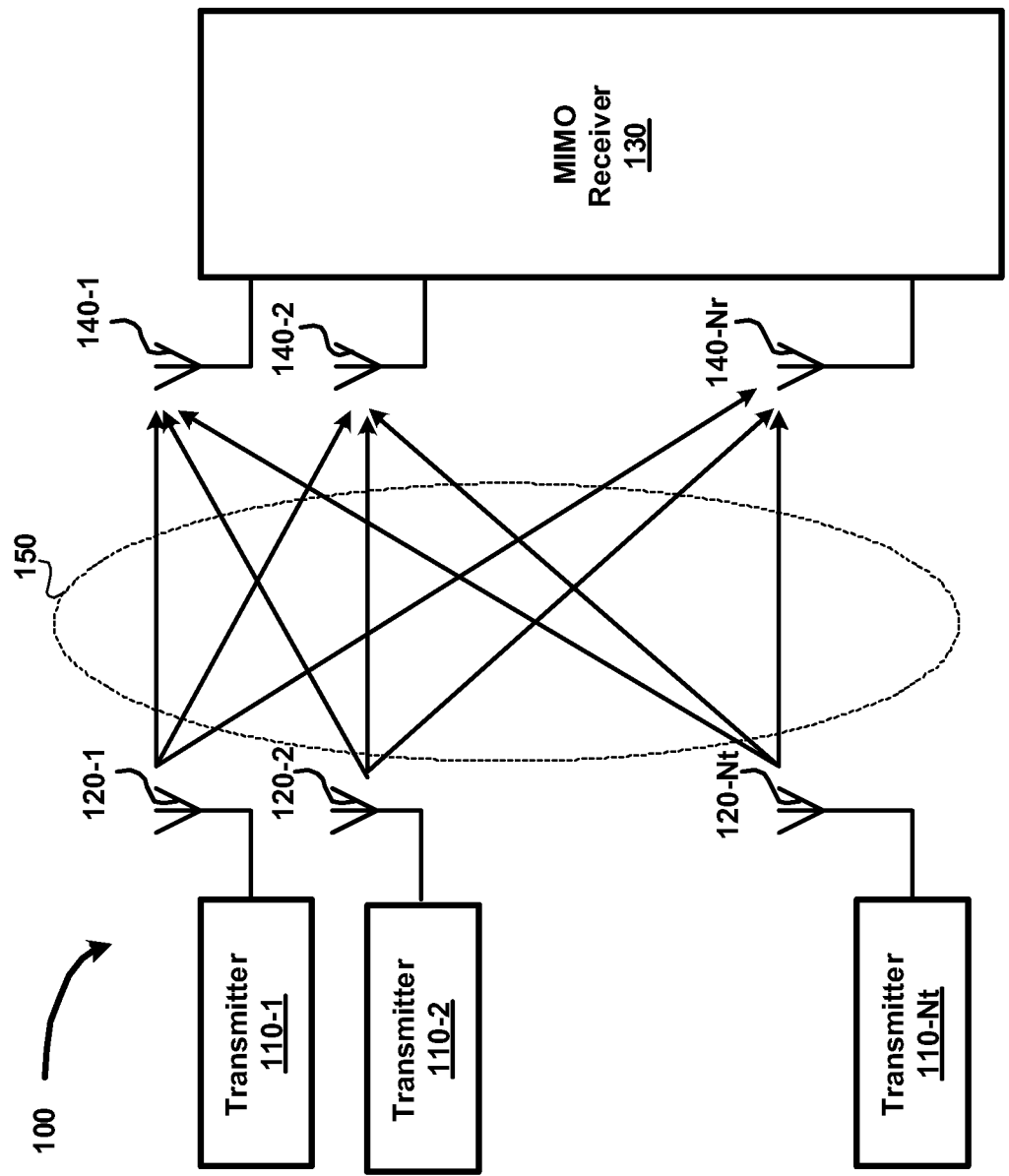
FIG. 1 is a block diagram illustrating the details of an example environment in which several embodiments can be implemented.

FIG. 1 is a block diagram illustrating the details of an example environment in which several embodiments can be implemented. MIMO system 100 is shown containing MIMO transmitters 110-1 through 110-Nt, with respective antennas 120-1 through 120-Nt, and MIMO receiver 130 with antennas 140-1 through 140-Nr. Each of MIMO transmitters 110-1 through 110-Nt represents a user terminal such as, for example, a cell phone or a laptop or a personal digital assistant (PDA). MIMO receiver 130 may represent a cellular base station (BS). The system 100 of FIG. 1 is referred to as a multi-user MIMO system on the uplink. However, the specific details of FIG. 1 are meant merely to illustrate, and embodiments of the present disclosure can be deployed in other environments as well. Such other environments may contain more or fewer components than shown in FIG. 1. For example, instead of Nt separate MIMO transmitters (each corresponding to a user), a single device with Nt transmit antennas may also be used.

Each of the transmitters 110-1 through 110-Nt transmits on the same frequency, and each of the transmitted signals occupy the same bandwidth. Further, the transmissions from transmitters 110-1 through 110-Nt are synchronized, such that each transmits a symbol in a corresponding symbol period. Any of well-known modulation techniques (e.g., 4-QAM etc.) may be used to transmit signals carrying the data.

As indicated by the corresponding arrows in FIG. 1, a signal transmitted from an antenna of MIMO transmitter 110-1 may be received at all antennas 140-1 through 140-Nr of MIMO receiver 130, with corresponding modifications in amplitude and/or phase caused by the wireless medium 150 through which it propagates. Thus, each of antennas 140-1 through 140-Nr receives a corresponding signal, which is a weighted sum of all transmitted signals (i.e., from all antennas 120-1 through 120-Nt.

The following equation specifies a signal vector received at MIMO receiver 130:

$$y_c = H_c x_c + n_c \qquad \text{Equation 1A}$$

wherein, $y_c$ represents the received signal vector at MIMO receiver 130, and contains Nr complex entries, each corresponding to a signal received at a corresponding one of the Nr antennas 140-1 through 140-Nr, $x_c$ represents the transmitted signal vector containing each of the complex Nt symbols transmitted from the corresponding one of MIMO transmitters 110-1 through 110-Nt, Hc represents the channel transfer matrix of dimension Nr×Nt, with each entry (channel coefficient) representing a channel gain for a corresponding transmit antenna-receive antenna pair, $n_c$ is a noise vector, containing Nr entries, with each of the Nr entries representing a corresponding additive noise added to the signal received at the corresponding one of antennas 140-1 through 140-Nr by MIMO receiver 130. Entries of $n_c$ may be modeled as variables with Gaussian distribution, with a zero mean and corresponding variances.

In Equation 1 above, the channel (representing by matrix $H_c$) is assumed to be a frequency non-selective (flat fading) channel, and the signal bandwidth of each of the signals transmitted by transmitters 110-1 through 110-Nt is much smaller than the channel coherence bandwidth.

However, the techniques of the present invention are also applicable when the channel is frequency selective. As is well-known in the relevant arts, a frequency selective channel does not have a flat response over the signal bandwidth of interest. Instead the gains for each frequency (or frequency portions/bins) in the bandwidth of interest may have different gains. When operating in frequency selective channels, embodiments of the present invention may use multi-carrier modulation (such as Orthogonal Frequency Division Multiplexing or OFDM) in each of transmitters 110-1 through 110Nt.

As is well known in the relevant arts, in OFDM, multiple mutually orthogonal sub-carriers are used to carry data. Since the bandwidth required for each sub-carrier being much smaller than the channel coherence bandwidth, with OFDM, a frequency selective channel behaves as a flat channel for each sub-carrier. Matrix $H_c$ in such a case will have multiple entries corresponding to each (transmit antenna-receive antenna) pair. Assuming for example that 64 subcarriers are used in each transmitted signal, there would be an $H_c$ matrix corresponding to each of the sub-carriers, and thus a total of 64 $H_c$ matrices with corresponding gain entries. The techniques of the present invention can be individually applied to each transformation ($y_c = H_c x_c + n_c$) on each subcarrier.

Channel transfer matrix Hc (or in the case of MIMO OFDM, the multiple channel matrices) may be made available to MIMO receiver 110 in a known way. For example, prior to transmission of actual data (information), and/or at periodic intervals during operation of MIMO system 100, transmitters 110-1 through 110-Nt and MIMO receiver 130 may exchange respective signals of pre-determined characteristics, and measure the changes in amplitude and phase of the signals caused by the wireless channel 150, thereby obtain the entries of channel matrix $H_c$.

The process of detection in MIMO receiver 130, therefore, entails determination or estimation of the transmitted signal vector x (i.e., the Nt symbols transmitted in each symbol period) based on a knowledge of channel matrix $H_c$ and the measured values of received signal vector $y_c$ (i.e., the signal measured at each of the Nr receive antennas). In addition, statistics of noise vector n may also be used in estimating transmitted signal vector $x_c$.

In Equation 1A, the entries in $y_c$, $x_c$, $H_c$, and $n_c$ are complex numbers, with a real part and an 'imaginary' part. In embodiments of the present invention, the 'complex' system model represented by Equation 1A, is first converted to a 'real' system model represented as shown below:

$$y_r = H_r * x_r + n_r \qquad \text{Equation 2A}$$

wherein $y_r$ is the vector containing the real and imaginary parts of $y_c$, stacked one below the other, and is of size (2Nr×1), $x_r$ is the vector containing the real and imaginary parts of $x_c$, stacked one below the other, and is of size (2Nt×1), $n_r$ is the vector containing the real and imaginary parts of $n_c$, stacked one below the other, and is of size (2Nr×1), and $$H_r = \begin{bmatrix} R(H_c) & -I(H_c) \\ I(H_c) & R(H_c) \end{bmatrix},$$

wherein $R(H_c)$ and $I(H_c)$ are the real and imaginary parts of matrix $H_c$. Matrix $H_r$ is of size 2Nt×2Nr.

For notational convenience, the subscripts r in Equation 2A are dropped. The system model after dropping the subscripts r in Equation 2A is given by $$y = H * x + n \qquad \text{Equation 2B}$$

Several candidate vectors may be tried as potential solution vectors (seeking to represent the actual transmitted vector), and that candidate vector that minimizes the cost $\|Hx-y\|^2$ may be selected as the final solution vector. The approach of the minimization of the cost $\|Hx-y\|^2$ over all possible solution vectors is also termed as the maximum likelihood (ML) detection, which is also equivalent to minimizing a function f(x) given by the following equation:

$$f(x)=x^T H^T H x - 2y^T H x \qquad \text{Equation 2C}$$

wherein T represents a matrix transpose operation.

f(x) is also termed the ML cost.

However, it is noted that Equation 2A is equivalent to Equation 1A, differing merely in representation. In alternative embodiments of the present invention, the 'complex' model represented by Equation 1A may be used instead.

A prior detection technique employs Markov Chain Monte Carlo (MCMC) techniques to obtain an estimate of the transmitted vector x, and is described next.

2. Conventional MCMC Detection

In the prior conventional MCMC technique, an initial symbol vector $x^{t=0}$ (of size 2Nt×1, and symbols denoted as $x_1^{(0)}$, $x_2^{(0)}$ and so on till $x_{2Nt}^{(0)}$) is selected randomly as a potential solution vector. Each symbol in the initial symbol vector is chosen from a random distribution of all possible symbol values from the modulation alphabet. Thus for example, assuming the alphabet consists of four symbols, each symbol in the potential solution vector is chosen randomly from a uniform distribution of the four symbols.

The cost $\|y-Hx\|^2$ associated with the initial symbol vector is then computed. A next candidate vector for consideration as a solution vector is obtained by performing Gibbs sampling from a joint distribution $P(x_1, x_2, \ldots x_{2Nt}|y, H)$. Joint distribution P specifies the probability distribution of all possible transmitted vectors given a received vector y and channel matrix H, and is proportional to the value of the expression $(\exp[-(\|y-Hx\|^2)/\alpha^2\sigma^2])$, wherein, 'exp' specifies an "e to the power of" operation, $\sigma^2$ represents the noise variance in receiver 130, and $\alpha^2$ represents a temperature parameter that serves to reduce the higher moments of the number of iterations, and thereby to maximize the probability of arriving at the correct solution quickly when only a finite number of iterations are used.

With $\alpha^2=1$, the above expression reduces to $(\exp[-(\|y-Hx\|^2)/\sigma^2])$.

Obtaining the next candidate vector involves sequentially determining each symbol in the vector. Thus, since a next candidate vector should have 2Nt co-ordinates, 2Nt selections are required for each iteration i.e., a next-candidate vector determination. In each iteration, 2Nt updates are carried out by sampling from the distribution noted above in a manner as described next.

Each iteration, i.e., determination of each next-candidate vector, involves 2Nt sub-steps (referred to conveniently as s1 through s2Nt). In each sub-step of iteration (t+1), the values of all symbols (or co-ordinates) except one are retained with the same values as in the immediately previous iteration (t). Corresponding to each possible value of the remaining symbol (selectable from the modulation alphabet), a corresponding intermediate vector is constructed retaining the previous values (from iteration t) of all the other symbols. Thus, the number of intermediate vectors equals the number of symbols in the modulation alphabet. For example, if the modulation alphabet has four symbols, four intermediate vectors are obtained in each sub-step. The values of the probabilities of each such intermediate vector is computed from the expression $(\exp[-(\|Hx-y\|^2)/\alpha^2\sigma^2])$. The selection of the intermediate vectors in each sub-step is clarified further below, in which it is assumed that the modulation alphabet consists of four symbols namely −3, −1, +1 and +3.

Denoting 't' as the iteration index and T as the co-ordinate index in a candidate vector, the initial symbol vector at iteration is denoted by the vector $[x_1^{(t)}, x_2^{(t)}, \ldots x_{2Nt}^{(t)}]^T$, with $x_1^{(t)}$ being the first symbol of the vector at time t, $x_2^{(t)}$ being the second symbol of the vector at time t, and so on.

In sub-step s1 of the next iteration (t+1), four intermediate vectors are constructed retaining the values of all symbols $x_2^{(t)}$ through $x_{2Nt}^{(t)}$ the same as in the initial symbol vector, but each with one of the four possible values for symbol $x_1^{(t)}$. Since the alphabet consists of the symbols −3, −1, +1 and +3, the following four intermediate vectors are constructed in sub-step s1:

$$x_{inter1}^{(t+1)}=[-3, x_2^{(t)}, \ldots x_{2Nt}^{(t)}]^T,$$

$$x_{inter2}^{(t+1)}=[-1, x_2^{(t)}, \ldots x_{2Nt}^{(t)}]^T,$$

$$x_{inter3}^{(t+1)}=[+1, x_2^{(t)}, \ldots x_{2Nt}^{(t)}]^T, \text{ and}$$

$$x_{inter4}^{(t+1)}=[+3, x_2^{(t)}, \ldots x_{2Nt}^{(t)}]^T.$$

Figure 2A:
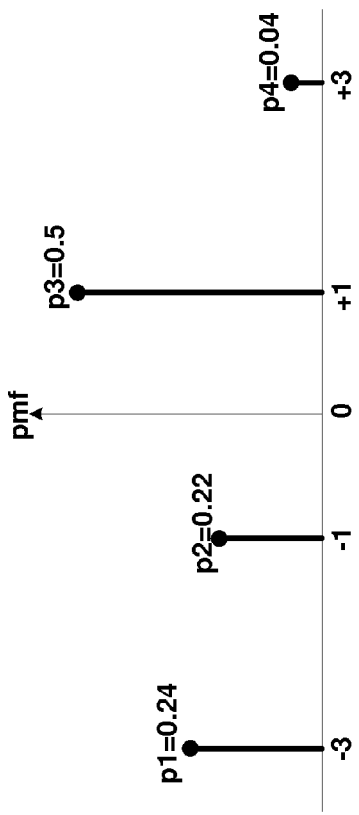
FIG. 2A shows an example probability mass function used in selecting a symbol using Gibbs sampling, in an embodiment of the present invention.
Figure 2B:
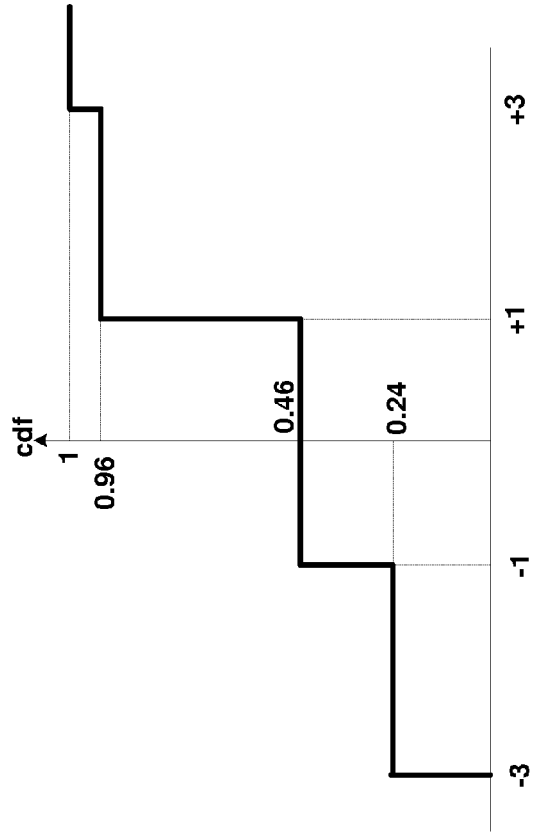
FIG. 2B shows cumulative distribution function (cdf) corresponding to the probability mass function of FIG. 2A.

The probability values of each of the four intermediate vectors noted above is then computed based on the expression $(\exp[-(\|y-Hx\|^2)/\alpha^2\sigma^2])$. These four values are normalized to form a valid probability mass function (pmf). Denote each of the four probability values as p1, p2, p3 and p4. Assuming p1, p2, p3 and p4 are respectively 0.24, 0.22, 0.5 and 0.04, the corresponding probability mass function is shown in FIG. 2A, and the corresponding cumulative distribution function (cdf (210)) is shown in FIG. 2B.

Figure 2C:
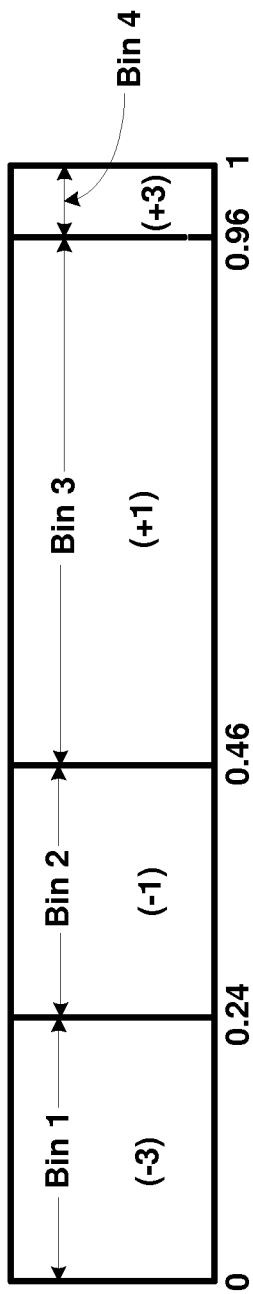
FIG. 2C shows four bins formed from the cdf of FIG. 2B.

From this cdf (210), bins are formed as shown in FIG. 2C, wherein each bin corresponds to a symbol in the alphabet. In the example of FIG. 2C, bin1 from extends from 0 to 0.24 and corresponds to symbol −3, bin2 extends from 0.24 to 0.46 and corresponds to symbol −1, bin3 extends from 0.46 to 0.96 and corresponds to symbol +1, and bin4 extends from 0.96 to 1 and corresponds to symbol +3. A uniform random number between 0 to 1 is then generated, and the value of x1(t+1) is selected to be that symbol that corresponds to the bin that this random number falls in. For example, if the random number obtained has a value of 0.5, $x_1^{(t+1)}$ is set to the symbol corresponding to bin 3, in this case +1. Other symbols of the next candidate vector are determined in a similar fashion, keeping the rest of the other corresponding symbols the same as in the previous iteration. At the end of 2Nt sub-steps a new candidate vector is thus obtained.

The ML cost of the new candidate vector may be computed, following which other candidate vectors may be formed and evaluated in a similar fashion. The candidate vector with the least ML cost after a desired number of iterations is then declared as the solution vector.

However, the prior (conventional) MCMC technique described above may have a drawback referred to as 'stalling', according to which two or more successive candidate vectors may all be the same, and therefore a solution vector with a desired ML cost may not be obtained even after a large number of iterations. A modified MCMC sampling technique according to the present invention overcomes such a problem as described next.

3. Mixture Sampling Algorithm

In embodiments of the present invention, the technique of selection of each symbol of a next candidate vector is selectable between the conventional MCMC technique (Gibbs sampling) described in detail above, and a random sampling from a uniform distribution of the symbols of the modulation alphabet. The modified sampling technique is referred to as randomized MCMC (RMCMC) or alternatively as "Mixture Sampling Algorithm". In an embodiment of the present invention, a probability value q is set equal to ½Nt, wherein Nt is the number of transmitters, and the Gibbs sampling samples the distribution (exp $[-(\|y-Hx\|^2)/\alpha^2]$), i.e., with the temperature parameter $\alpha^2$ set to 1.

The probability of selection of a symbol of the next candidate vector using random sampling is q, while the probability of selection of the symbol using Gibbs sampling is (1−q). A random number between 0 to 1 is then generated. If the value of the random number is less than q, then random sampling is used to select the symbol, but if the value of the random number is greater than or equal to q, then Gibbs sampling is used. By providing an option for such selection of each symbol of a next candidate vector, the stalling problem of the prior conventional MCMC technique is overcome. The technique of selecting a symbol (or co-ordinate) of each candidate vector using either Gibbs sampling or random sampling as described above is termed randomized MCMC (RMCMC) or as Mixture Sampling Algorithm, and provides a low-complexity algorithm with near ML (maximum likelihood) performance. Each candidate vector thus obtained may be evaluated against its ML cost, and the vector with the least ML cost may be declared as a final solution vector representing a transmitted vector.

It may be appreciated that the Mixture Sampling Algorithm, in effect, samples one of two probability distributions, the distributions being:

exp $[-(\|y-Hx\|^2)/\alpha^2\sigma^2]$ (with $\alpha^2$ set to the value 1) corresponding to conventional MCMC, and exp $[-(\|y-Hx\|^2)/\alpha^2\sigma^2]$ (with $\alpha^2$ set to the value infinity), the distribution then reducing to a uniform distribution.

It is noted, however, that the two distributions used by the Mixture Sampling Algorithm are not restricted to those noted above. In general, by suitably selecting the value of $\alpha^2$ in each of the two probability distributions, other probability distribution pairs can instead be used to select a symbol of a candidate vector.

In an embodiment, the number of iterations of the Mixture Sampling Algorithm before a final solution vector is declared is fixed. However, in other embodiments, other stopping criteria may be used. For example, a dynamic stopping criterion is used in an alternative embodiment that yields good performance without unduly increasing the complexity. The criterion works as described next.

A stalling is said to have occurred if the ML cost remains unchanged in two consecutive iterations. Once such a stalling is identified, the Mixture Sampling Algorithm generates a positive integer termed the stalling limit (Sl), and the iterations are allowed to continue in stalling mode (i.e., without ML cost change) up to a maximum of (Sl) iterations from the occurrence of stalling. If a lower ML cost is encountered before Sl iterations, the algorithm proceeds with the newly found lower ML cost, otherwise the Mixture Sampling Algorithm terminates. If termination does not happen through stalling limit as above, the Mixture Sampling Algorithm terminates on completing a pre-determined maximum number of iterations. The value of Sl may be chosen based on the quality of the stalled ML cost. A large value for Sl is preferred if the quality of the stalled ML cost is poor, because of the available potential for improvement from a poor stalled solution. On the other hand, if the stalled ML cost quality is already good, then a small value of Sl is preferred. The quality of a stalled solution is determined in terms of closeness of the stalled ML cost to a value obtained using the statistics (mean and variance) of the ML cost for the case when x is detected error-free.

The Mixture Sampling Algorithm of the present invention may not be near-optimal (i.e., may not result in a satisfactorily low ML cost) for higher order modulation techniques (e.g., 16-QAM, 32-QAM, 64-QAM, 128-QAM etc.). Another aspect of the present invention addresses this problem as described next.

4. Mixture Sampling Algorithm with Restarts

In 'Mixture Sampling Algorithm with restarts' (which may also be referred to as RMCMC with restarts), the basic Mixture Sampling Algorithm (described above) is run (i.e., performed or executed) multiple times, each time with a different random initial vector. The vector with the least ML cost at the end of the multiple runs is declared as the solution vector.

Thus, one 'run' of the Mixture Sampling Algorithm described above may be stopped after a predetermined number of iterations in a manner similar to that described above. However, after the predetermined number of iterations of the first run, the next initial candidate vector may be chosen randomly from the modulation alphabet, and the iterations are continued thereafter. The second run may be stopped also after a predetermined number of iterations, and subsequent similar runs of the Mixture Sampling Algorithm may be performed. Such restart allows the Mixture Sampling Algorithm to potentially consider a wider set of candidate vectors. The 'RMCMC with restarts' (alternatively also referred to as 'Mixture Sampling Algorithm with Restarts') provide solution vectors with sufficiently low ML cost even for higher order modulation techniques, without substantially increasing the computational complexity.

The multiple runs of the Mixture Sampling Algorithm may be performed one after the other. Alternatively, multiple iterations of the Mixture Sampling Algorithm, each with a corresponding initial vector (chosen randomly) may be performed in parallel. 'Mixture Sampling Algorithm with Restarts' may be performed such that a total desired number of iterations and restarts are performed. As an example, if the total number of iterations is desired to be 300, 150 iterations may be performed in a first run according to Mixture Sampling Algorithm starting with one initial vector, and another 150 iterations may be performed in a second run according to Mixture Sampling Algorithm starting with another initial vector. Another example is when four sets of 75 iterations are performed, each with a corresponding initial vector. After the end of the desired number of iterations and restarts, the candidate vector with the least ML cost is declared as the final solution vector.

In general, increasing the number of restarts improves performance, but is associated with higher computational complexity. In embodiments of the present invention, a decision whether to terminate the algorithm or to go for another restart is taken at the end of each restart, and is based on the ML cost of solution vectors, and the number of repetitions of the solution vectors. The Mixture Sampling Algorithm with automatic determination of the number of restarts to be used is summarized in the steps noted below:

Step 1: Choose an initial vector.

Step 2: Run the Mixture Sampling Algorithm

Step 3: Check if Rmax number of restarts are completed, wherein Rmax represents the maximum number to be used for restarts. If (Rmax) number of restarts are completed, control is transferred to Step 5, otherwise control is transferred to Step 4.

Step 4: For the solution vector with minimum ML cost obtained so far, find the required number of repetitions needed using the formula P=[max(0, c2 phi(x-tilde)].

In the formula for P noted above, phi(x-tilde) is the standardized ML cost of solution vector x-tilde and is specified by the following equation:

$$\text{phi}(x\text{-tilde}) = [\|y - H(x\text{-tilde})\|^2 - Nr(\sigma^2)] / [\text{sqrt}(Nr) * \sigma^2] \quad \text{Equation 3}$$

x-tilde is the solution vector with minimum ML cost thus far, sqrt is a square root operator. Check if the number of repetitions of this solution vector so far is less than the required number of repetitions computed in Step 4. If the number of repetitions is less, then control is transferred to Step 1, otherwise control is transferred to Step 5.

Step 5: Output the solution vector with the minimum ML cost so far as the final solution.

It is noted that Mixture Sampling Algorithm alone may be used (i.e., without restarts), or be combined with Mixture Sampling Algorithm with restarts. The Mixture Sampling Algorithm and the Mixture Sampling Algorithm with restarts as described above provide a low-complexity, yet near-optimal (in terms of obtainable ML costs) for detection of transmitted signals in a MIMO receiver.

It is further noted that the Mixture Sampling Algorithm and the Mixture Sampling Algorithm with restarts can, with appropriate modifications to the ML cost function, be extended to scenarios in which the number of actual (current) transmitters is less than the number of transmitters allowed to operate in the system, such a scenario being termed a sparse multi-user MIMO system. The ML cost to be used in the Mixture Sampling Algorithm and the Mixture Sampling Algorithm with restarts techniques is specified by $\|y - Hx_{cap}\|^2 + c\|x_{cap}\|_0$, wherein $c = \sigma^2 \log[(1-\beta)/(\beta/M)]$, wherein M is the number of symbols in the modulation alphabet used by the transmitters, β is the probability (also known as the activity factor) of transmission in a particular frame by a transmitter in the sparse multi-user MIMO system[01], xcap is a vector where each of its elements belongs to an augmented signal set which includes zero to the modulation alphabet (this is to account for the users who are in inactive state and hence are not transmitting), and |xcap|$_0$ is the zero-norm of vector xcap.

5. Digital Processing System

Figure 3:
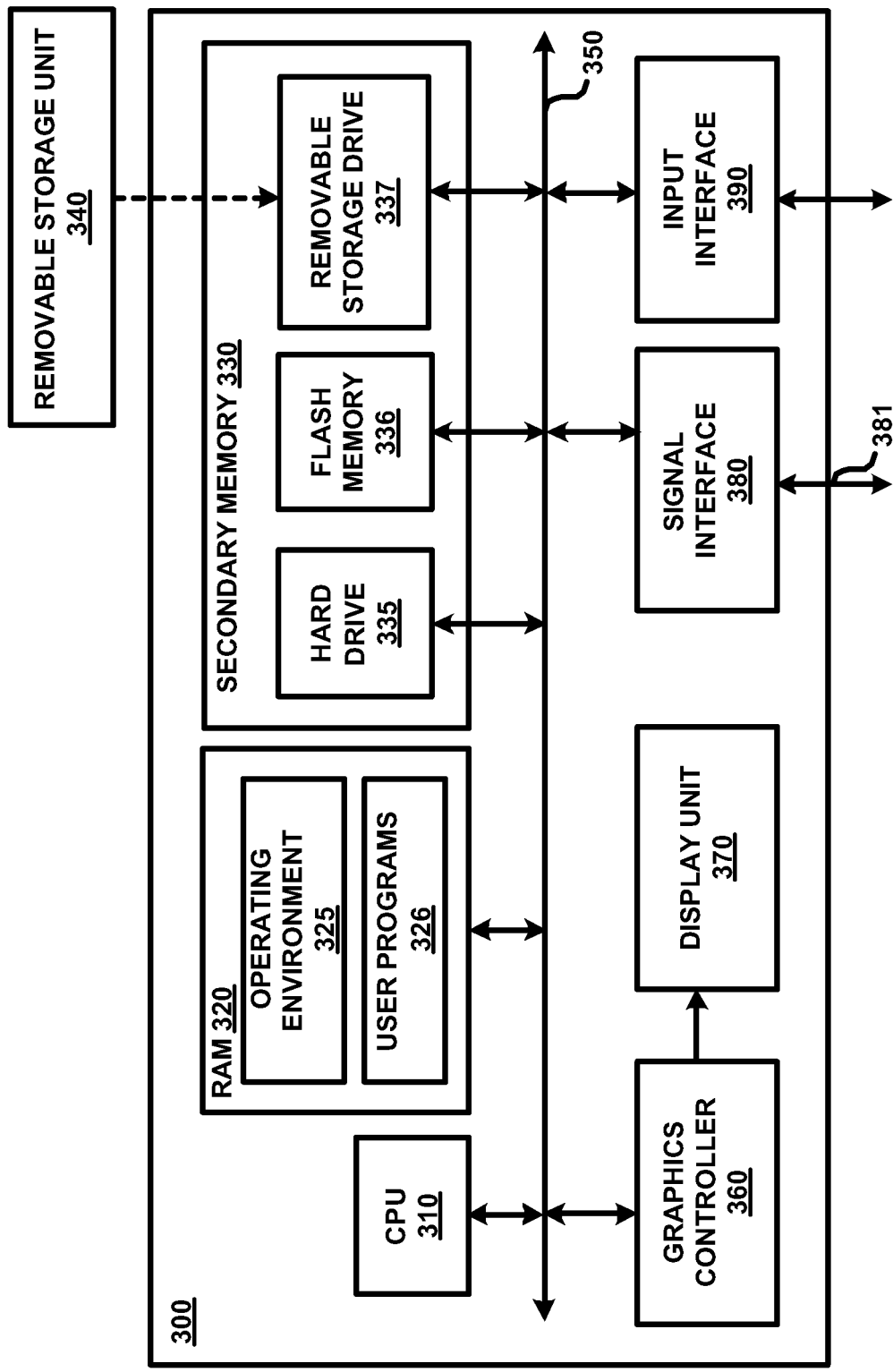
FIG. 3 is a block diagram illustrating relevant details of a wireless MIMO receiver, in which detection of a transmitted vector is performed by execution of appropriate execution modules.

FIG. 3 is a block diagram illustrating the details of a MIMO receiver, in which detection of a transmitted vector is performed by execution of appropriate software modules. Digital processing system (300) may be implemented as part of MIMO receiver 130 or as a system external to MIMO receiver 130, but designed to receive signal inputs enabling it to detect symbols of a transmitted vector. For simplicity, signal processing chains for implementing corresponding operations (such as filtering down-conversion, etc) on signals received from antennas 140-1 through 140-M of MIMO receiver 130 are not shown in FIG. 3. It is assumed that such components are present, and provide a baseband signal(s) to system 300 via path 381 (which may be connected to receive signals from multiple antennas, not shown) and signal interface 380.

Digital processing system 300 may contain one or more processors such as a central processing unit (CPU) 310, random access memory (RAM) 320, secondary memory 330, graphics controller 360, display unit 370, signal interface 380, and input interface 390. All the components except display unit 370 may communicate with each other over communication path 350, which may contain several buses as is well known in the relevant arts.

CPU 310 may execute instructions stored in RAM 320 to provide several features of the present invention. CPU 310 may contain multiple processing units, with each processing unit potentially being designed for a specific task. Alternatively, CPU 310 may contain only a single general-purpose processing unit.

RAM 320 may receive instructions from secondary memory 330 via communication path 350. RAM 320 is shown currently containing software instructions constituting operating environment 325 and/or user programs 326. The operating environment contains utilities shared by user programs, and such shared utilities include operating system, device drivers, virtual machines, etc., which provide a (common) run time environment for execution of user programs/applications.

Graphics controller 360 generates display signals (e.g., in RGB format) to display unit 370 based on data/instructions received from CPU 310. Display unit 370 contains a display screen to display the images defined by the display signals. Input interface 390 may correspond to a keyboard and a pointing device (e.g., touch-pad, mouse), and may be used to provide inputs.

Signal interface 380, as noted above, provides appropriate physical, electrical, and other protocol interfaces to the various signal processing chains (not shown) of MIMO receiver 130.

Secondary memory 330 may contain hard drive 335, flash memory 336, and removable storage drive 337. Secondary memory 330 may store data and software instructions, which enable digital processing system 300 to provide several features in accordance with the description provided above. The blocks/components of secondary memory 330 constitute computer (or machine) readable media, and are means for providing software to digital processing system 300. CPU 310 may retrieve the software instructions, and execute the instructions to provide various features of the embodiments described above Some or all of the data and instructions may be provided on removable storage unit 340, and the data and instructions may be read and provided by removable storage drive 337 to CPU 310. Floppy drive, magnetic tape drive, CD-ROM drive, DVD Drive, Flash memory, removable memory chip (PCMCIA Card, EPROM) are examples of such removable storage drive 337.

Removable storage unit 340 may be implemented using medium and storage format compatible with removable storage drive 337 such that removable storage drive 337 can read the data and instructions. Thus, removable storage unit 340 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

We claim:

1. A method of determining a transmitted vector (x) representing a plurality of symbols transmitted on a wireless medium by a corresponding plurality of wireless transmitters, said plurality of symbols belonging to an alphabet according to a modulation technique employed by each of said plurality of wireless transmitters, said method being performed in a wireless receiver, wherein said wireless receiver and said plurality of wireless transmitters form a multiple-input multiple-output (MIMO) system, said method comprising:

receiving a received vector (y) representative of said transmitted vector (x);

generating a first random number;

forming, in a first iteration, a first symbol of a first candidate vector, said first candidate vector representing a potential solution vector, wherein said forming is based on a first approach if said first random number is greater than a first predetermined value (q), but is based on a second approach if said random number is less than or equal to said first predetermined value (q), wherein said first approach randomly selects said first symbol from a uniform distribution of symbols in said alphabet, and wherein said second approach selects said first symbol based on Gibbs sampling, wherein the first predetermined value (q) equals ½Nt, wherein Nt represents the total number of transmitters in said plurality of wireless transmitters.

2. The method of claim 1, wherein selection, by said second approach, of said first symbol based on Gibbs sampling selects said first symbol based on a joint probability distribution of the set of all possible transmitted vectors given said received vector (y) and a channel matrix (H), wherein said channel matrix (H) represents a transformation, caused by said wireless medium, between said received vector (y) and said transmitted vector (x), wherein said first random number has a range of 0 to 1.

3. The method of claim 2, wherein selection, by said second approach, of said first symbol based on Gibbs sampling further comprises:

generating a plurality (M) of intermediate vectors, wherein each of said plurality (M) of intermediate vectors is obtained by retaining all other symbols except a value of said first symbol from a previous iteration, and selecting a current value of said first symbol iteratively from said alphabet;

computing a plurality of (M) probabilities from said joint probability distribution, each of said (M) probabilities representing a probability of a corresponding one of said plurality (M) of intermediate vectors;

forming (M) bins in the range 0 to 1 using the cumulative distribution function (cdf) of said (M) probabilities, wherein each bin corresponding to one of the symbols of said alphabet;

generating a second random number between 0 to 1;

identifying a corresponding one of said (M) bins based on a value of said second random number; and selecting that symbol from said alphabet as said first symbol which corresponds to a bin identified by said identifying.

4. The method of claim 3, wherein each of the steps of said generating a plurality (M) of intermediate vectors, computing a plurality of (M) probabilities, forming (M) bins in the range 0 to 1, generating a second random number between 0 to 1, and identifying a corresponding one of said (M) bins, is repeated within said first iteration to select each of the remaining symbols in said first candidate vector.

5. The method of claim 4, further comprising performing corresponding iterations to select corresponding candidate vectors as potential solution vectors and evaluating a maximum likelihood (ML) cost of each of said potential solution vectors, till a stop criterion is reached, wherein that solution vector having a least ML cost among all the solution vectors is declared as said transmitted vector (x).

6. The method of claim 5, wherein said first iteration is preceded by a previous iteration, said previous iteration being the initial iteration, wherein said previous iteration selects an initial vector, wherein each symbol of said initial vector is selected randomly from said alphabet.

7. The method of claim 6, wherein performing of said previous iteration, said first iteration and said corresponding iterations represents a first run, wherein said performing is restarted with a new vector in a second run, wherein symbols of said new vector are selected randomly from said alphabet.

8. The method of claim 7, wherein multiple runs of said previous iteration, said first iteration and said corresponding iterations are performed in parallel.

9. The method of claim 8, wherein said modulation technique is one of Quadrature Amplitude Modulation (QAM) and MIMO-OFDM (Orthogonal Frequency Division Multiplexing).

10. The method of claim 1, wherein said wireless receiver is a Base Station (BS) of a cellular system, wherein each of said plurality of wireless transmitters is one of a mobile phone, a laptop, and a personal digital assistant (PDA).

11. A wireless Multiple Input Multiple Output (MIMO) receiver to detect a transmitted vector (x) representing a plurality of symbols transmitted on a wireless medium by a corresponding plurality of wireless transmitters, said plurality of symbols belonging to an alphabet according to a modulation technique employed by each of said plurality of wireless transmitters, said wireless MIMO receiver comprising:

a signal interface to receive a received vector (y) representative of said transmitted vector (x), wherein a transformation between said received vector (y) and said transmitted vector (x) is represented by a channel matrix (H); and a processor to receive said received vector (y) from said signal interface, said processor operable to:

generate a first random number;

form, in a first iteration, a first symbol of a first candidate vector, said candidate vector representing a potential solution vector, wherein said processor forms said first symbol based on a first approach if said first random number is greater than a first predetermined value (q), but forms said first symbol based on a second approach if said random number is less than or equal to said first predetermined value (q), wherein in said first approach, said processor randomly selects said first symbol from a uniform distribution of symbols in said alphabet, and wherein in said second approach, said processor selects said first symbol based on Gibbs sampling, wherein the first predetermined value (q) equals ½Nt, wherein Nt represents the total number of transmitters in said plurality of wireless transmitters.

12. The wireless MIMO receiver of claim 11, wherein the values of said first random number range from 0 to 1.

13. The wireless MIMO receiver of claim 12, wherein in said second approach, said processor selects said first symbol based on a joint probability distribution of the set of all possible transmitted vectors given said received vector (y), and said channel matrix (H), wherein said channel matrix (H) represents a transformation, caused by said wireless medium, between said received vector (y) and said transmitted vector (x).

14. The wireless MIMO receiver of claim 13, wherein in said second approach said processor is further operable to:

generate a plurality (M) of intermediate vectors, wherein each of said plurality (M) of intermediate vectors is obtained by retaining all other symbols except a value of said first symbol from a previous iteration, and selecting a current value of said first symbol iteratively from said alphabet;

compute a plurality of (M) probabilities from said joint probability distribution, each of said (M) probabilities representing a probability of a corresponding one of said plurality (M) of intermediate vectors;

form (M) bins in the range 0 to 1 using the cumulative distribution function (cdf) of said (M) probabilities, wherein each bin corresponding to one of the symbols of said alphabet;

generate a second random number between 0 to 1;

identify a corresponding one of said (M) bins based on a value of said second random number; and select that symbol from said alphabet as said first symbol which corresponds to an identified bin.

15. The wireless MIMO receiver of claim 14, wherein said processor is operable to repeat each of generating a plurality (M) of intermediate vectors, computing a plurality of (M) probabilities, forming (M) bins in the range 0 to 1, generating a second random number between 0 to 1, and identifying a corresponding one of said (M) bins, within said first iteration to select each of the remaining symbols in said first candidate vector.

16. The wireless MIMO receiver of claim 15, wherein said processor is further operable to perform corresponding iterations to select corresponding candidate vectors as potential solution vectors and evaluating a maximum likelihood (ML) cost of each of said potential solution vectors till a stop criterion is reached, wherein that solution vector having a least cost among all the solution vectors is declared as said transmitted vector (x).

17. The wireless MIMO receiver of claim 16, wherein said wireless MIMO receiver is a Base Station (BS) of a cellular system, wherein each of said plurality of wireless transmitters is one of a mobile phone, a laptop and a personal digital assistant (PDA).

18. A method of determining a transmitted vector (x) representing a plurality of symbols transmitted on a wireless medium by a corresponding plurality of wireless transmitters, said plurality of symbols belonging to an alphabet according to a modulation technique employed by each of said plurality of wireless transmitters, said method being performed in a wireless receiver, wherein said wireless receiver and said plurality of wireless transmitters form a multiple-input multiple-output (MIMO) system, said method comprising:

receiving a received vector (y) representative of said transmitted vector (x);

generating a random number;

forming a first symbol of a first candidate vector, said first candidate vector representing a potential solution vector, wherein said forming forms said first symbol by sampling a first probability distribution if a value of said random number is greater than a first predetermined value (q), but forms said first symbol by sampling a second probability distribution if said value of said random number is less than or equal to said first predetermined value (q), wherein each of said first probability distribution and said second probability distribution represents joint probability distributions of all possible transmitted vectors given said received vector y and a channel matrix H, wherein said random number has a range of 0 to 1, wherein each of said first probability distribution and said second probability distribution is proportional to the expression $\exp[-(\|y-Hx\|^2)/\alpha^2\sigma^2]$, wherein $\sigma^2$ represents the noise variance in said wireless receiver, wherein $\alpha^2$ represents a temperature parameter, wherein said first probability distribution uses a first value for $\alpha^2$ and said second probability distribution uses a second value for $\alpha^2$, said first value being different from said second value, and wherein said first value is infinity and said second value is one.

* * * * *

UNITED STATES PATENT AND TRADEMARK OFFICE
CERTIFICATE OF CORRECTION

PATENT NO.        : 8,675,780 B2                                    Page 1 of 1
APPLICATION NO.   : 13/472519
DATED             : March 18, 2014
INVENTOR(S)       : Chockalingam et al.

It is certified that error appears in the above-identified patent and that said Letters Patent is hereby corrected as shown below:

In the Claims

In column 11, lines 1-2, in Claim 1, delete "greater than" and insert -- less than --, therefor.

In column 11, lines 3-4, in Claim 1, delete "less than or equal to" and insert -- greater than or equal to --, therefor.

In column 12, line 34, in Claim 11, delete "greater than" and insert -- less than --, therefor.

In column 12, lines 36-37, in Claim 11, delete "less than or equal to" and insert -- greater than or equal to --, therefor.

In column 14, line 14, in Claim 18, delete "greater than" and insert -- less than --, therefor.

In column 14, line 17, in Claim 18, delete "less than or equal to" and insert -- greater than or equal to --, therefor.

Signed and Sealed this
Twenty-fourth Day of February, 2015

Michelle K. Lee
*Deputy Director of the United States Patent and Trademark Office*